(No Model.)  4 Sheets—Sheet 3.
J. P. DUNN.
CORN HARVESTER AND HUSKER.
No. 415,242.  Patented Nov. 19, 1889.
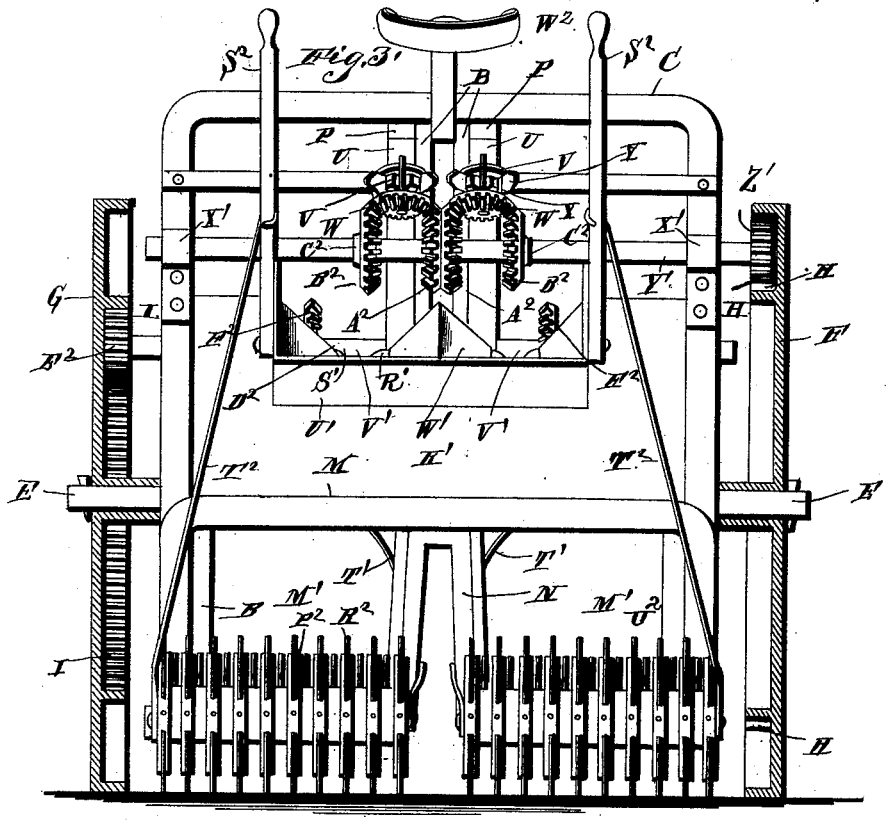
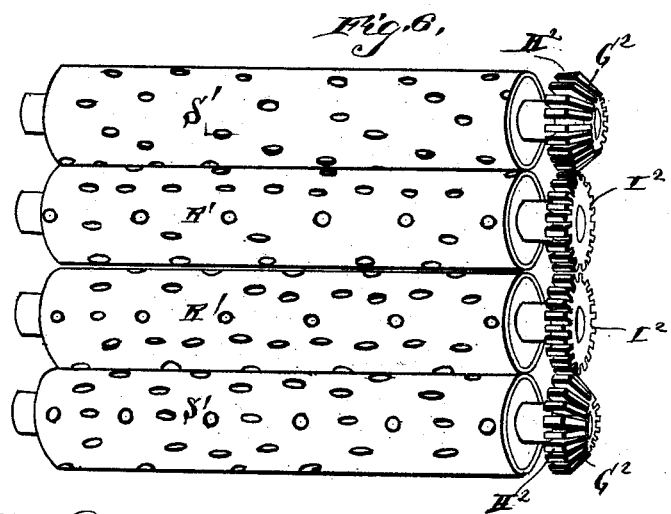
Witnesses
Inventor
John P. Dunn
By his Attorneys (No Model.) 4 Sheets—Sheet 4.
J. P. DUNN.
CORN HARVESTER AND HUSKER.
No. 415,242. Patented Nov. 19, 1889.
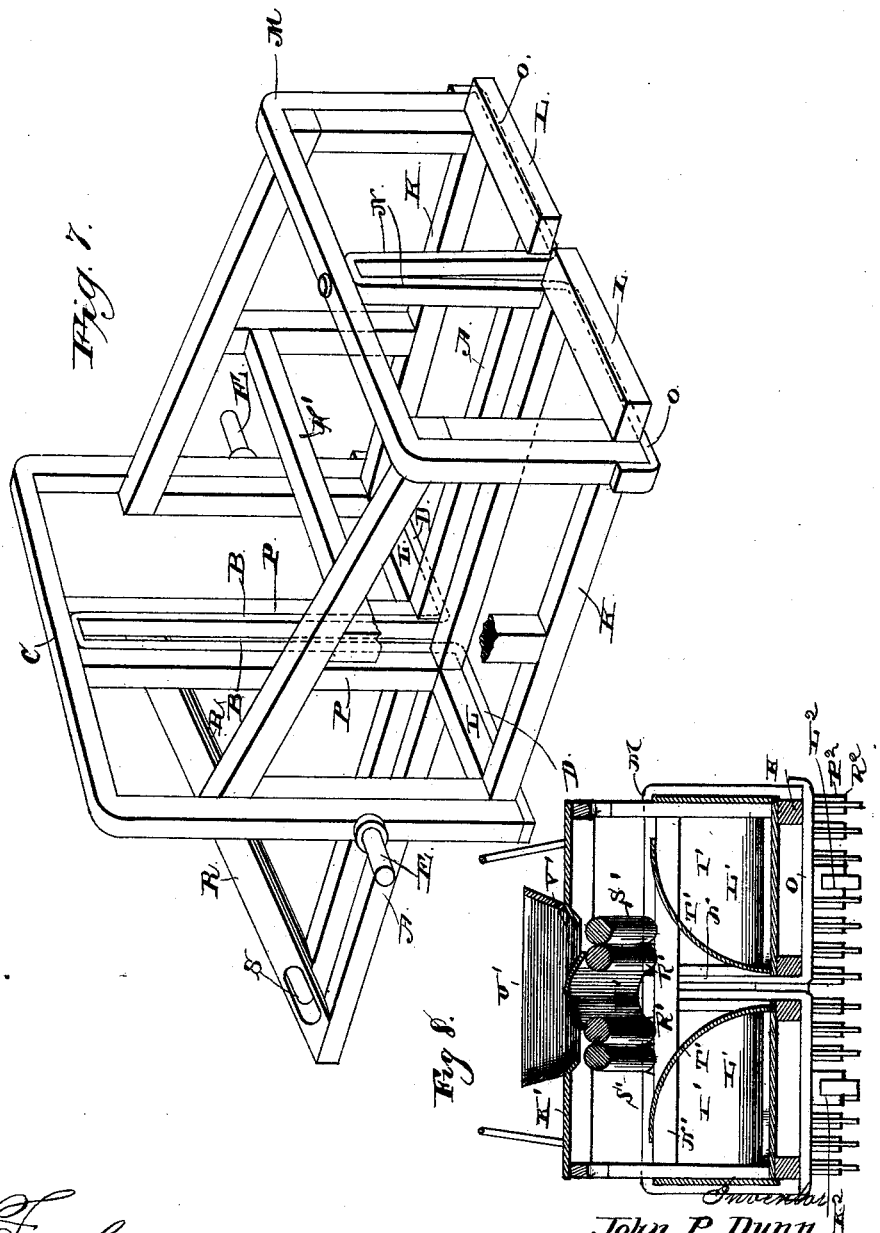

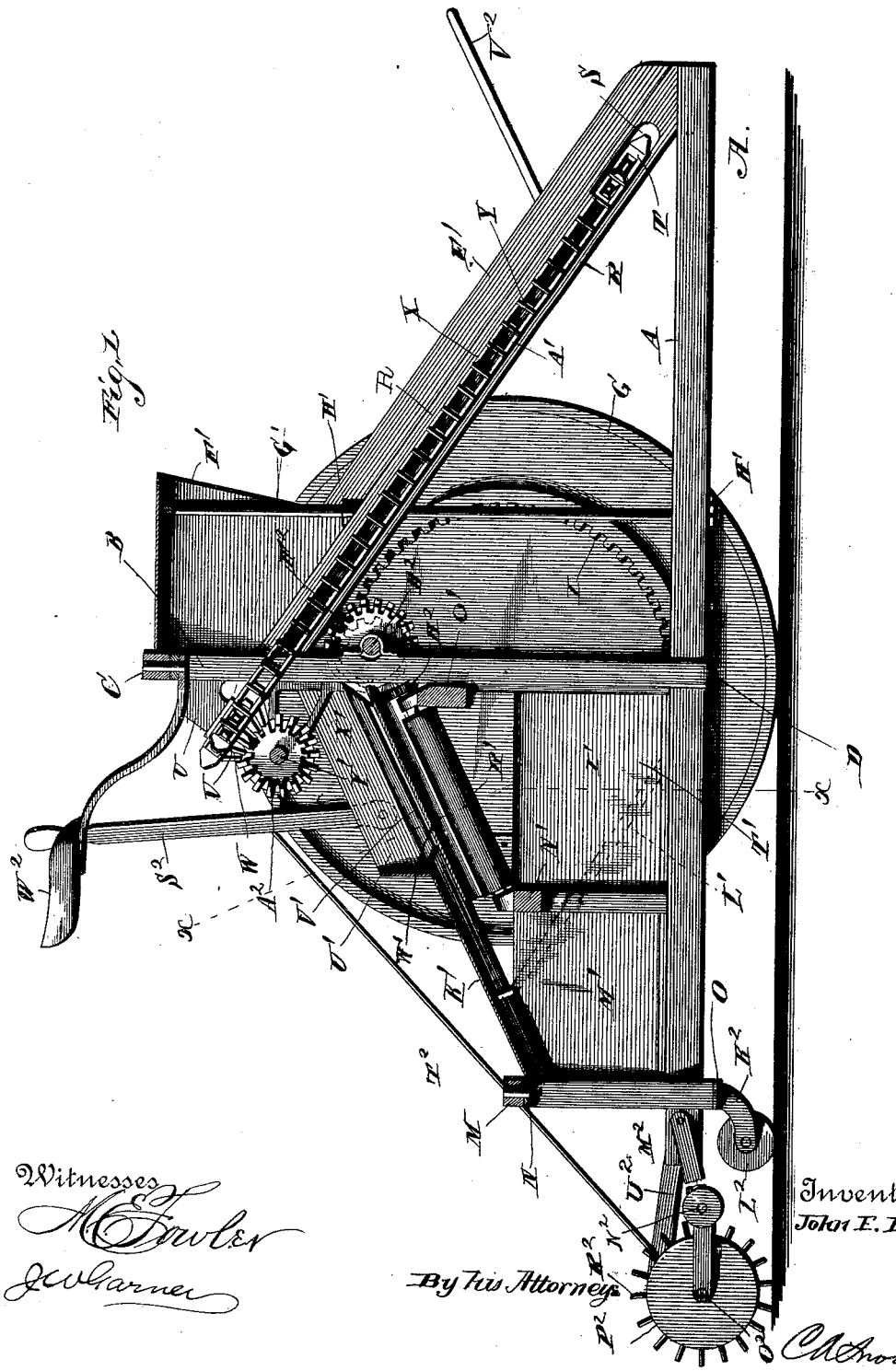

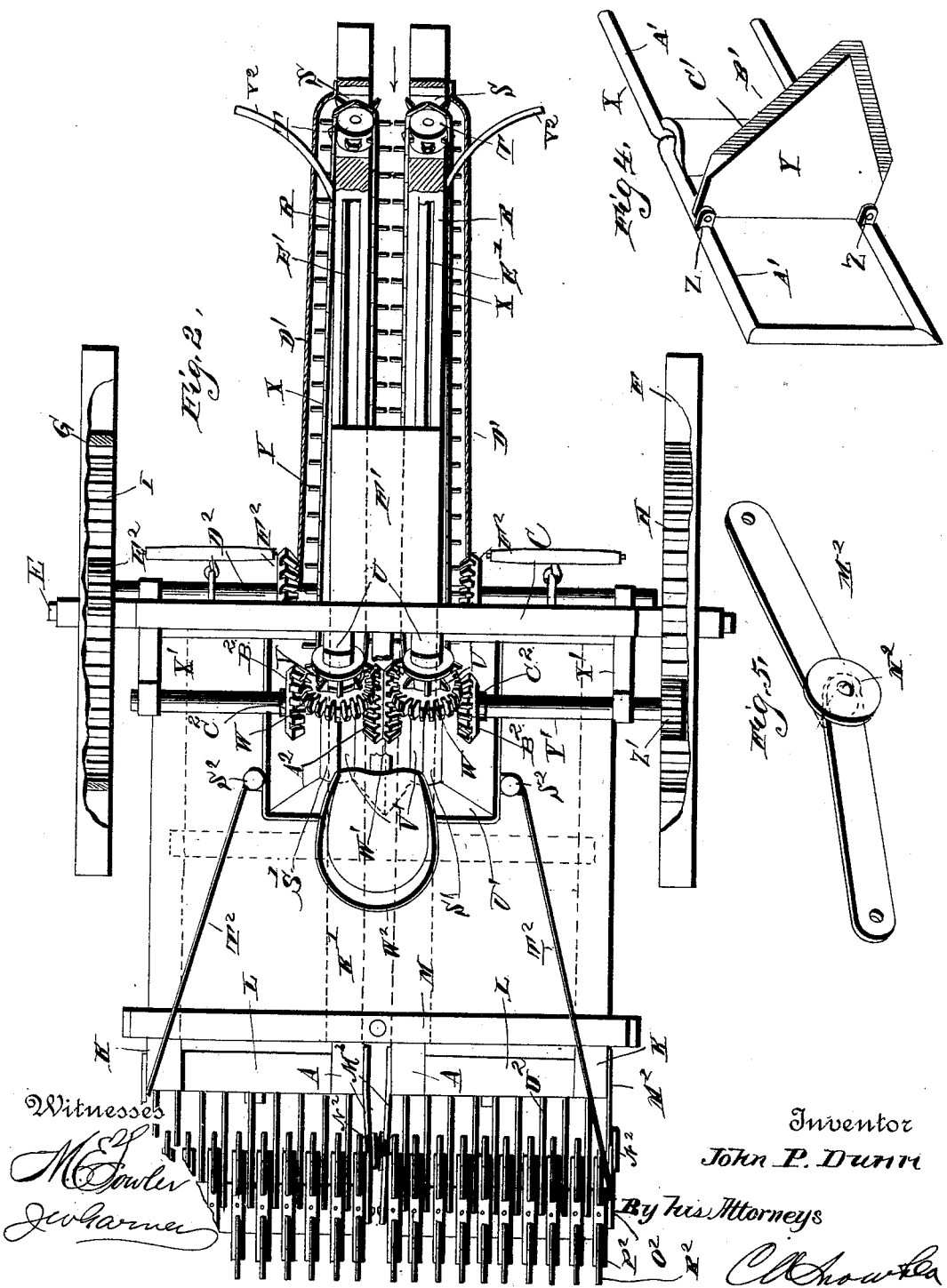

UNITED STATES PATENT OFFICE.

JOHN P. DUNN, OF BEATRICE, NEBRASKA, ASSIGNOR OF ONE-HALF TO T. H. FITTON, OF SAME PLACE.

CORN HARVESTER AND HUSKER.

SPECIFICATION forming part of Letters Patent No. 415,242, dated November 19, 1889.

Application filed November 17, 1888. Serial No. 291,179. (No model.)

*To all whom it may concern:*

Be it known that I, JOHN P. DUNN, a citizen of the United States, residing at Beatrice, in the county of Gage and State of Nebraska, have invented a new and useful Improvement in Corn Harvesters and Huskers, of which the following is a specification.

My invention relates to an improvement in corn harvesters and huskers; and it consists in the peculiar construction and combination of devices that will be more fully set forth hereinafter, and particularly pointed out in the claims.

In the drawings, Figure 1 is a vertical longitudinal central sectional view of a corn harvester and husker embodying my improvement. Fig. 2 is partly a top plan view and partly a sectional view of the same. Fig. 3 is a rear elevation of the same partly in section. Figs. 4, 5, and 6 are detailed views. Fig. 7 is a perspective view of the frame. Fig. 8 is a transverse section on the line $x\ x$ of Fig. 1.

A represents a pair of longitudinal beams, which are arranged under the center of the machine at a slight distance apart, and are supported at a suitable distance from their front ends by hangers B, which are bolted under the center of an arched axle C. The vertical arms of the latter have their lower ends bolted to the outer ends of the horizontal portions D of hangers B. The said vertical arms of the arched axle are provided with spindles E, on which are journaled a pair of driving and supporting wheels F G. The wheel F is provided on its inner side with a gear H, having outward-projecting spurs, and the wheel G has a similar gear I, with inward-extending spurs.

Arranged parallel with the beams A and on the outer sides of the same are a pair of beams K, which have their front and rear ends connected to the beams A by cross-beams L.

M represents an inverted-U-shaped yoke, which has its lower end on the outer side of the beams K at the rear ends thereof, and bolted to and depending from the center of the said yoke is a U-shaped hanger N, having horizontal arms O at its lower ends, which arms extend outward under the beams A K and are secured to the lower ends of the arms of yoke M. The front ends of the beams K are secured on the horizontal arms of the hanger B.

P represents a pair of vertical beams, which rise from the beams A at points directly over the horizontal arms of hanger B and have their upper ends secured under the center of the arched axle, said beams being arranged on the outer sides of the vertical portions of the hanger.

R represents a pair of inclined beams, which extend from the front ends of the beams A to the beams or standards P near the upper ends of the latter, and near the lower ends of said beams R are transverse openings S, in which are mounted sprocket-wheels T. On the rear sides of the beams or standards P, at the upper ends thereof, are brackets U, which are provided with downwardly-extending spindles arranged at right angles to the beams R, and on the said spindles are journaled sprocket-wheels V and miter gear-wheels W, said sprocket-wheels being rigidly secured to the said miter-wheels or formed integrally therewith, as may be preferred. The wheels V and T are connected together in pairs by sprocket-chains X, and from the outer side of said sprocket-chains project cutter-plates Y, which are triangular in shape, as shown in Fig. 4, and have their bases bolted or riveted to ears Z, that project from the links A' about the centers of said links. The inclined upper and lower edges of the cutter-plates Y are beveled, as at B', and the said beveled edges of the plates are provided with file-like teeth or serrations C'.

On the outer side of each inclined beam R is a shield-plate D', which covers the outwardly-projecting plates, and on the upper side of each inclined beam R is secured a side board E'.

F' represents a hood that arches the space between the beams R at the upper end thereof, and is secured on the said beams and bears against the standards P.

G' represents a U-shaped brace-bolt that extends through the beams A and R and has its upper ends arranged under the hood. The said brace-bolt is provided with clamping-nuts H', that secure it to the beams R and A.

Arranged in rear of the arched axle and supported on the beams A K are a pair of compartments or boxes I'. The said compartments are covered by an inclined roof K', and at the rear of each compartment I' is an inclined board L', the said boards serving to form compartments M' in rear of the compartments I'.

Arranged transversely over the compartments I' is a beam N', and a similar beam O' is secured to the vertical arms of the arched axle and to the vertical beams or standards P, and is arranged over the front ends of the compartments I' and in a somewhat higher plane than the beam N'.

Journaled in bearings on the beams O' and N' are two pairs of downwardly and rearwardly inclined husking-rollers R' S', the members of said pairs of rollers being in contact with each other and the rollers R' being out of contact with each other. The said rollers R' bridge the space between the compartments I', and the rolls S' are arranged directly over the said compartments. Near the front ends of the compartments I', on the inner sides thereof, are inclined boards or shields T', which have their upper ends arranged under and within the rollers S' and have their lower ends secured to the beams A. The roof or cover K' of the compartments I' has a hopper U' near its upper end at its center, the said hopper having openings V' above the pairs of rollers R' S' and having a central deflecting-shield W' arranged directly over the rollers R' and bridging the space between them.

On the rear side of the vertical arms of the axle are brackets or bearings X', in which is journaled a shaft Y'. The said shaft has a pinion Z' at one end that engages the gear H of wheel F, and secured rigidly to the center of the said shaft and facing outwardly in opposite directions are miter gear-wheels $A^2$, which engage the miter-wheels W and thereby cause the endless chains X to move in the direction indicated by the arrow in Fig. 2 when the machine is drawn forward.

$B^2$ represents a pair of gear-wheels, which are loosely mounted on the shaft Y', engage the sides of the wheels W opposite from the wheels $A^2$, and are prevented from slipping laterally on the shaft Y' by means of collars $C^2$. The function of the wheels $B^2$ is to counteract the tendency of the wheels W to move laterally from the wheels $A^2$, and thereby relieve the spindles on which said wheels W are journaled of lateral strain.

$D^2$ represents the shaft, which is journaled in bearings on the front side of the vertical arms of the axle. The said shaft has a pinion $E^2$ at one end that meshes with the internal gear I, and also secured to the said shaft are miter-wheels $F^2$, which engage miter-wheels $G^2$ on the front ends of the rollers S'. Formed integral with the wheels $G^2$ are pinions $H^2$, which engage similar pinions $I^2$ on the rollers R', and thereby cause said rollers R' S' to rotate in opposite directions when the machine is drawn forward, as will be readily understood.

Arranged under the center of the compartment M', at the rear ends thereof, are swiveled frames $K^2$, provided with supporting rollers or wheels $L^2$, which bear upon the ground and support the rear end of the machine.

Pivoted on the outer side of the beams A K, at the rear ends thereof, are rearward-extending arms $M^2$, which are provided at their centers with pivoted joints $N^2$. Shaft $O^2$ are journaled in the rear ends of the said arms and are provided with circular disks $P^2$, arranged at suitable distances apart and provided with radial spurs $R^2$, which bear upon the ground as the shafts rotate. Levers $S^2$ have their lower ends pivoted to the sides of the hopper U' or to any other suitable portion of the frame, and said levers are connected to the rear ends of the arms $M^2$ by rods $T^2$. By moving the levers forward the rear ends of the levers $M^2$ may be elevated to raise the spur-disks from the ground, and by moving the said levers to the position indicated in the drawings the spur-disks are lowered to the ground, as shown, and caused to rotate by frictional contact therewith.

Projecting from the rear ends of the bottoms of the compartments M' are clearer-bars $U^2$, which are inclined downwardly and forwardly, as shown, and have their rear ends arranged between the disks $P^2$.

The horses are hitched to suitable whiffletrees on the front end of the compartments I', are arranged on the outer sides of the beams A, and their collars are connected by the usual breast-straps to arms $V^2$, that project forward and are bent outward from the beams R.

The operation of my invention is as follows: The driver, seated on the seat $W^2$, directs the team so that the beams A are on opposite sides of a row of standing cornstalks, and as the machine progresses the cutter-plates on the inner sides of the chains X pull the ears of corn from the stalks and convey the said ears to a point above the hopper and drop the same downward therein. The shield W' and the inclined sides of the hopper direct the ears of corn onto the pairs of rollers R' S'. Said rollers engage the husks and strip the same from the ears of corn, as will be readily understood. The husks are drawn downward between the rollers R' S' and discharged by the boards T' through the opening between the beams A onto the ground, while the ears of corn slip downward on the husking-rollers, drop from the same onto the boards L', and roll down the said boards into the compartments I'. The boards E' and the hood F' prevent ears of corn from bouncing from the elevating-chains over the beams R. In the event that any of the ears of corn should fall to the ground when they are severed from the stalk they will be engaged by the spurs R² of the trailing disks P², and as the latter rotate the said ears will be carried to their upper sides and withdrawn from the spurs by the clearer-bars U², down which they roll into the compartments M' in rear of the compartments I'.

Having thus described my invention, I claim—

1. The corn-harvester having the trailing disks or rollers provided with radial spurs, substantially as described.

2. The combination, in a corn-harvester, of the trailing disks or rollers having the radial spurs and the clearer-arms U², substantially as described.

3. The combination of the frame having the central parallel longitudinal beams A, the inclined beams R, extending upward and rearward from the front ends thereof, the endless conveyers supported by the said beams R and having the cutter-plates, said conveyers having the driving-gears W at their upper ends, the wheel F on one side of the frame having the external gear H, the wheel G on the opposite side of the frame having the internal gear I, the shaft Y', having the pinion engaging the gear H and having the wheels A² engaging the wheels W, the husking-rollers geared together and having the gears G², the shaft D², having the pinion E² engaging the internal gear I, and the gears F², rigid on the said shaft and engaging the wheels G², whereby motion is imparted to the conveyers and to the husking-rollers, substantially as described.

4. The combination of the central longitudinal beams A A, the standards rising therefrom, the compartments I' on opposite sides of the said beams and in rear of the standards, said compartments having the boards T' on their inner sides, the pairs of rollers R' S', said rollers R' bridging the space between the compartments and said rollers S' being geared to rollers R', the driving-wheel, and the shaft D², mounted on the standards and geared to the said wheel and to the rollers S', substantially as described.

5. The combination, with a corn-harvester, of the rearward-extending jointed arms M², pivoted thereto, the rollers or disks journaled in the said arms and having the spurs R², the levers S², pivoted on the frame, and the rods T², connecting the said levers to the arms M², substantially as described.

In testimony that I claim the foregoing as my own I have hereto affixed my signature in presence of two witnesses.

JOHN P. DUNN.

Witnesses:
  E. G. SIGGERS,
  J. H. SIGGERS.